(12) United States Patent
Sandfort et al.

(10) Patent No.: US 11,741,261 B2
(45) Date of Patent: *Aug. 29, 2023

(54) REQUESTS AND COMPUTE RESOURCES

(71) Applicant: HEWLETT-PACKARD DEVELOPMENT COMPANY, L.P., Spring, TX (US)

(72) Inventors: Patrick O. Sandfort, Vancouver, WA (US); Holt Mebane, San Diego, CA (US); Jun Zeng, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 327 days.

This patent is subject to a terminal disclaimer.

(21) Appl. No.: 17/146,308

(22) Filed: Jan. 11, 2021

(65) Prior Publication Data
US 2021/0141936 A1  May 13, 2021

Related U.S. Application Data

(63) Continuation of application No. 15/764,318, filed as application No. PCT/US2015/059347 on Nov. 5, 2015, now Pat. No. 10,896,264.

(51) Int. Cl.
*G06F 21/62* (2013.01)
*G06F 16/2458* (2019.01)
(Continued)

(52) U.S. Cl.
CPC ...... *G06F 21/6254* (2013.01); *G06F 11/3082* (2013.01); *G06F 16/2465* (2019.01);
(Continued)

(58) Field of Classification Search
CPC ............... G06F 21/6254; G06F 21/604; G06F 11/3082; G06F 16/2465; G06F 21/62; H04W 12/009; H04L 2101/681
See application file for complete search history.

(56) References Cited

U.S. PATENT DOCUMENTS 8,443,071 B2  5/2013 Lu et al.
8,976,388 B2  3/2015 Bhatia
(Continued)

FOREIGN PATENT DOCUMENTS

CN  101529208  9/2009
WO  WO-2013072925 A2  5/2013
(Continued)

OTHER PUBLICATIONS

Cleeff et al., "Benefits of Location-Based Access Control: A Literature Study, 2010 IEEE/ACM Int'l Conference on Green Computing and Communications & Int'l Conference on Cyber, Physical and Social Computing", IEEE, 2010, pp. 739-746.
(Continued)

*Primary Examiner* — Thaddeus J Plecha
(74) *Attorney, Agent, or Firm* — Michael Dryja

(57) ABSTRACT

In an example, a collection of compute resources corresponding to a class of devices is identified with a request and a synthesis routine is performed via a number of destinations corresponding to the class of devices. In an example, a type of compute resource to use with an operation of a request is determined, a device with the type of compute resource determined for the operation of the request is identified; the identified device performs the operation of the request within a bounds of a policy, and a result of the operation is communicated to a remote storage location.

20 Claims, 5 Drawing Sheets

(51) Int. Cl.
*H04W 12/00* (2021.01)
*G06F 11/30* (2006.01)
*G06F 21/60* (2013.01)
*H04L 101/681* (2022.01)

(52) U.S. Cl.
CPC ............ *G06F 21/604* (2013.01); *G06F 21/62* (2013.01); *H04W 12/009* (2019.01); *H04L 2101/681* (2022.05)

(56) References Cited

U.S. PATENT DOCUMENTS

| | | | |
|---|---|---|---|
| 8,996,647 | B2 | 3/2015 | Lingafelt et al. |
| 10,896,264 | B2 * | 1/2021 | Sandfort ............... G06F 21/604 |
| 2004/0133547 | A1 | 7/2004 | Doi |
| 2008/0004994 | A1 | 1/2008 | Ainsworth |
| 2009/0063516 | A1 | 3/2009 | Wang et al. |
| 2009/0119299 | A1 | 5/2009 | Rhodes |
| 2009/0187579 | A1 | 7/2009 | Brancaccio et al. |
| 2010/0318492 | A1 | 12/2010 | Utsugi |
| 2011/0314538 | A1 | 12/2011 | Huang |
| 2012/0216252 | A1 | 8/2012 | Skaaksrud |
| 2013/0232546 | A1 | 9/2013 | Shimono |
| 2014/0025338 | A1 | 1/2014 | Blount |
| 2014/0162711 | A1 | 6/2014 | Miller, II et al. |
| 2014/0163927 | A1 | 6/2014 | Molettiere et al. |
| 2014/0207721 | A1 | 7/2014 | Filson |
| 2014/0359035 | A1 | 12/2014 | Wang et al. |
| 2015/0006450 | A1 | 1/2015 | Ferre |
| 2015/0177733 | A1 * | 6/2015 | Isaksson ............ H04W 72/0446 700/73 |
| 2015/0334181 | A1 * | 11/2015 | Jiménez ............ H04L 67/1076 709/204 |
| 2016/0078061 | A1 | 3/2016 | Hilsdale |
| 2016/0088474 | A1 * | 3/2016 | Smith ................... H04W 12/06 370/310 |
| 2016/0205450 | A1 | 7/2016 | Gartseev |
| 2016/0275285 | A1 | 9/2016 | Childress |
| 2016/0288596 | A1 * | 10/2016 | LeMense ............ B60C 23/0459 |
| 2016/0314186 | A1 * | 10/2016 | Bremer ................... G06F 16/22 |

FOREIGN PATENT DOCUMENTS

| | | |
|---|---|---|
| WO | WO-2013123445 | 8/2013 |
| WO | WO-2015000770 A1 | 1/2015 |
| WO | WO-2015092801 | 6/2015 |

OTHER PUBLICATIONS

Lang et al. "Proximity-Based Access Control (PBAC) using Model-Driven Security", Springer, 2015. pp. 157-170.

ZIH. Corp. "Instacart selects Zebra Technologies' Zatar Internet of things platform for cloud printing"; Jun. 25, 2015; Zatar IoT Platform Integrated for Cloud Printing . . . ; 6 pages.

\* cited by examiner

REQUESTS AND COMPUTE RESOURCES

CROSS-REFERENCE TO RELATED APPLICATIONS

This application is a continuation of U.S. patent application Ser. No. 15/764,318, filed on Oct. 4, 2018, which is a 371(c) National Phase Application of International Application No. PCT/2015/059347, filed Nov. 5, 2015, both of which are herein incorporated by reference in their entireties.

BACKGROUND

Compute devices may collect and store information as well as communicate information to other compute devices. Compute devices have resources to perform operations on information and provide results, such as by communicating the results to a connected device.

DETAILED DESCRIPTION

Figure 1:
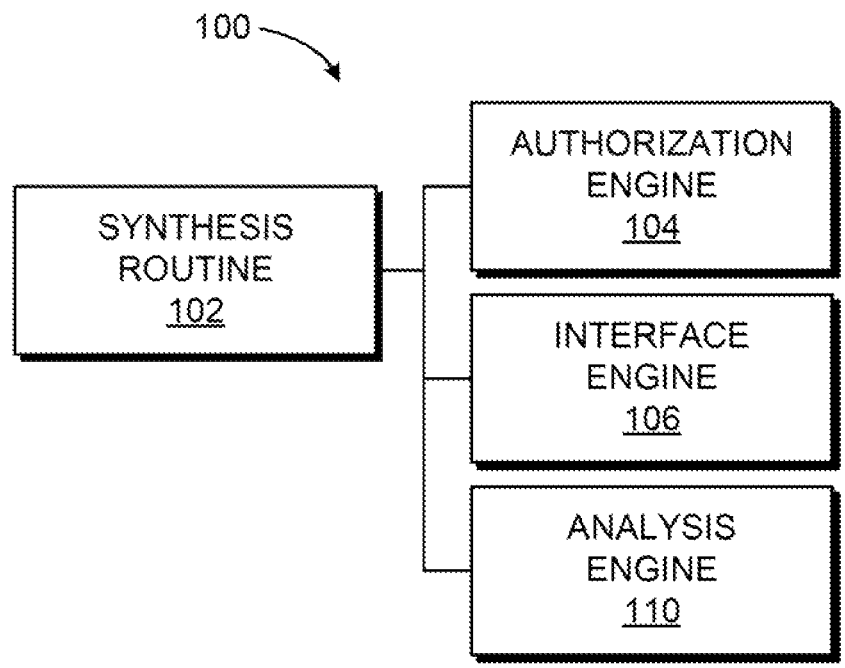
FIGS. 1 and 2 are block diagrams depicting example resource systems.

In the following description and figures, some example implementations of apparatus, systems, and/or methods for providing access to a result of a synthesis routine are described. Devices are becoming increasingly connected. The "Internet of Things" (IoT) allows cloud-based services to interact with devices in various locations and with various capabilities. IoT devices may be minimalistic in nature, with processing, storage, and networking capabilities at a restrictive capacity to enable smaller form factors, increase mobility, and/or reduce power consumption and/or cost. The benefit of IoT devices may increase when the devices are able to collaborate readings to adapt to a different or related purpose and produce analysis on sensor readings, such as forward projections.

Various examples described below relate to enabling a framework for analysis of sensor data of an IoT device or multiple IoT devices. For example, a control panel on a home printer may offer access to analysis operations on data retrieved from a smart watch or a security camera. The architecture and operations described herein enables providing access to a result of a synthesis routine. The architecture and operations described herein may allow for performing the synthesis operations on data across a plurality of devices and allow for creating a personalized synthesis routine based on a specified data type (e.g., a customized data type). A system may host compute resources (such as processing, storage, and network resources) that perform the synthesis routines on data collected from multiple IoT devices and sensors, and thus, allow an access point to perform collective analysis operations. Furthermore, computing abilities of the IoT device may, for example, provide further computing functionality beyond what the IoT device could do on its own by utilizing a resource group of data sourced from multiple sensors. For example, a wrist wearable IoT device that tracks daily exercise may provide data to a data pool and allow a thermostat to access a synthesis routine to, based on the data pool, predict the time of day that exercise routine may be completed and, accordingly, set a temperature of an environment (e.g., a room) to a desired level.

As discussed further herein, the resource system described enables operations of synthesis routines on a resource group. As used herein, a resource group represents a pool of resources (e.g., stored data) that can be made accessible to a synthesis operation. For example, the resource group may be data stored on a distributed collection of resources near a device hosting the synthesis operation (e.g., local to the network where the host device is located). For another example, a resource group may include historical data stored on a secured public cloud, such as marking local sensor data as satisfying a duration that when expires causes a transfer to a remote storage location and maintaining a profile used to identify and/or characterize the remotely stored historical data. The access to analysis capabilities and resources, for example, may be provided to IoT devices based on agreements for use (e.g., lease local computing resources) and access to the synthesis routines and/or resources may be restricted based on the access terms of the agreements as well as proximity to the device hosting the local compute resources.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the term "maintain" (and variations thereof) as used herein means "to create, delete, add, remove, access, acquire, update, and/or modify."

Figure 2:
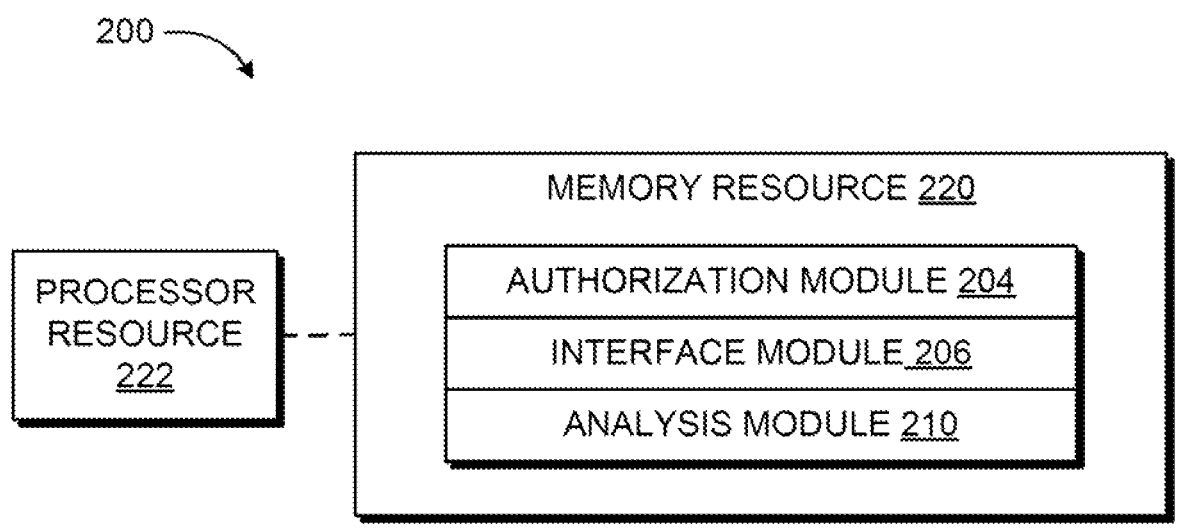

FIGS. 1 and 2 are block diagrams depicting example resource systems 100 and 200. Referring to FIG. 1, the example resource system 100 of FIG. 1 generally includes a resource group 102, an authorization engine 104, an interface engine 106, and an analysis engine 110. In general, the interface engine 106 may provide access to a synthesis routine 102 performable via the analysis engine 110 based on authorization from the authorization engine 104. For example, the engines 104, 106, and 110 may be part of a wireless router that manages access to synthesis routines, such as synthesis routine 102, and local compute resources by authorizing and providing access to devices connected to the wireless router.

As used herein, a synthesis routine represents an analysis operation performable on a resource. For example, an aggregation routine may be performed on sensor data from a temperature sensor and a chemical sensor. In that example, the data from the temperature sensor and the chemical sensor may be kept on a local compute resource near a kitchen from which the readings are being taken. Example synthesis routines include joining multiple databases, aggregation of data from multiple sources, combining data from multiple data streams, concatenation of multiple data items, compression of multiple data items, generation of a predictive formula based on regression schemes over multiple sensing data streams that are numerical in nature, generation of an event classifier by combining multiple data streams that are nominal in nature, generation of a group event into clusters, and the like (or a combination thereof). Other example synthesis routines may include operations customized or otherwise specific to a particular data type. Example synthesis routines may involve analysis techniques, such as regression schemes, Bayesian classifiers (such as Naïve Bayes classifiers), support vector machines, artificial neural networks, deep learning schemes, clustering methods (such as K-means clustering methods), and the like (or a combination thereof).

A local compute resource represents any allocateable resource usable to assist performance of an operation and is within a proximity threshold of a compute device (e.g., local). The proximity threshold may define a boundary for a local environment. As used herein, a local environment is the environment where the host device is located and/or network topology associated with the host device, and a host device, as used herein, refers to a compute device providing the local compute resource. The proximity threshold may be within a particular compute device (such as a host device), within a distance from a particular compute device, or within a boundary defined with reference to a particular compute device, such as a building housing a wireless access point or within a network boundary of a network coupled to a network security device. Example proximity thresholds include a number of feet from a compute device, within transmittable range of an antenna from a compute device, within a house, within an office building, within an area distinguishable by a floor plan, and within the same logical computing network.

Example compute resources that are usable to assist performance of an operation include processor resources, memory resources, networking resources, power resources, input output (10) resources, authentication resources, and virtual resources. Example processor resources include allocation of time to a central processing unit (CPU) or dedicating access of the CPU to a particular session of requests. Example memory resources include storage devices (such as persistent storage device including disk drive or flash memory), allocation of a portion of a computer-readable medium to a device, avocation of time to utilize a computer-readable medium, and allocation of a particular amount of storage size to a session of requests. Example networking resources including allocating bandwidth, use of a network interface device, or other allocation of a connection to a session of requests. Example power resource include allocating a power unit to charge a device, which may include allocating an amount of time and/or an amount of charge to be provided to a device. Example RD resources include allocation of an IO device (such as a memory card reader, a graphical control panel), allocation of a functionality of an IO device to a session of requests, allocation of an interface or port (such as a USB interface or a display port providing audio-visual output), and allocation of data of an IO device (such as scan data from a multi-function printer scan device or printed output produced by print job data). Example authentication resources include allocation of a device that perform security operations and/or analysis (such as a fingerprint reader) and allocation of time or a result of using a functionality of a security device (such as time interval for using a report provided by a biometric sensor), Example virtual resources include allocation of data (such as access logs or historical sensor logs of a device), allocations of data structures (such as databases or nodes of databases), application functionalities, and/or any virtual instantiations of the above mentioned compute resources to a session of requests.

The authorization engine 104 represents any circuitry or combination of circuitry and executable instructions to authorize an analysis request. The authorization engine 104 may determine an authorization level of an analysis request based on a proximity threshold and/or access terms associated with the source or destination of the analysis request.

For example, the authorization engine 104 may represent a combination of circuitry and executable instructions that determines an authorization level of an analysis request based on whether the destination and/or source of the analysis request is within a proximity threshold of the host device that includes local compute resources containing data used by a synthesis routine of the analysis request. As used herein, an analysis request is a communication regarding execution of a synthesis routine, such as proposing to perform the synthesis routine, modify a synthesis routine, and the like. The analysis request may cause operations associated with performing analysis on data, such as identification of parameters of the request, identification of the synthesis routine to perform, identification of the data to use with the synthesis routine, performing the synthesis routine, and delivery of the result of the synthesis routine to a destination. An analysis request may comprise a synthesis routine, Example analysis requests include access requests to access a synthesis routine or access a result of a synthesis routine, allocation requests that assign a compute resource to a synthesis operation, deallocation requests to remove assignments of a data type to a synthesis routine, and modification requests to modify the association of a data type to a synthesis routine or modification of the operations of the synthesis routine. For example, an analysis request may be a request to execute a synthesis routine that accesses a storage location to store data (e.g., a perform routine request) and/or to manage synthesis routine data (e.g., an add routine request). For another example, an analysis request may be a request to allocate time on a CPU for a synthesis routine.

The authorization engine 104 may represent circuitry or a combination of circuitry and executable instructions to identify a first location of a source of the analysis request and compare the first location to a proximity threshold based on a second location of the compute device hosting a local compute resource of the resource group used to perform the synthesis routine of the analysis request. In this manner, the authorization engine 104 may determine whether to authorize an analysis request and/or the level of authorization of the analysis request based on the proximity threshold.

As used herein, a source represents an application or a device that generates the analysis request. For example, a mobile phone application or a printer control panel may be activated by a user to request access to results of a synthesis routine. For another example, a source may be an IoT sensor that provides data at certain time intervals or when particular conditions (e.g., a threshold and/or a state) are satisfied, such as a motion detection device that sends sensor data in response to a change in a captured image, and requests a forward projection analysis on the provided data. A destination, as used herein, represents an application or a device that receives the result of the synthesis operation.

The interface engine 106 represents any circuitry or combination of circuitry and executable instructions to assign a data property to an analysis request. For example, the interface engine 106 may be a combination of circuitry and executable instructions that when executed by the circuitry cause the circuitry to identify a data property associated with the type of analysis requested by the analysis request, and assign the data property to the analysis request (e.g., associate a data property with the synthesis routine of the analysis request) in response to a determination that the analysis request (e.g., the source of the analysis request) is authorized to access the local compute resource.

The interface engine 106 may provide information to access the synthesis routines and/or results of the synthesis routines. For example, the interface engine 106 may represent circuitry or a combination of circuitry to facilitate access to the synthesis routine and the local compute resources with data useable with the synthesis routine. Example operations to facilitate access to the synthesis routine includes publishing a list of synthesis routines, publishing resources (such as storage sizes, processor utilizations, services, data types, and functionalities) and providing interfaces to access the results of the synthesis routine in a manner associated with the authorization level identified by the authorization engine 104, For example, the interface engine 106 may publish (e.g., broadcast) a list of synthesis routines local compute resources to devices within a range of the system, such as a proximity threshold discussed herein. For another example, the interface engine 106 may provide the virtual infrastructure to a source to perform a synthesis routine using a host device. For yet another example, the interface engine 106 may publish a data type compatible with (e.g., offerable from or maintainable by) the synthesis routine 102, such as broadcast a list of data types compatible with a synthesis routine to a non-integrated IoT device provider.

The interface engine 106 may provide an interface to access the synthesis routine to devices within a proximity range of the system as a platform as a service (PAAS) infrastructure, for example. In that example, the interface may be provided by the interface engine 106 based on an authorization level of the destination being sent the interface information. An authorization level, as used herein, represents a degree of permissions to perform operations associated with the local compute resource. For example, a first degree of permission may allow a source to access a number of synthesis routines, a second degree of permission may allow a source to access a greater number of synthesis routines, a third degree of permission may allow a source to access anonymized data, and a fourth degree of permission may deny any attempt to access data on the local compute resource. Permissions may be represented by levels, degrees, categories, or other identifiers that represent bounds of a policy, such as a security policy or a management policy. Policies may be based on various attributes of use of the local resource, such as time, utilization, percentage, or otherwise defined by access terms in an agreement between a source (and/or destination) and the system 100.

An authorization level determined by the authorization engine 104 may be determined based on a data property, such as a data property associated with a source, destination, a synthesis routine, a data type, a local compute resource, or a combination thereof. As used herein, a data property represents a classification representable by an identifier, such as a value, a number, a character, a string, a label, etc. Example data properties assignable to a synthesis routine, to local compute resources, and/or to data associated with local compute resources and/or synthesis routines include a security property and/or a management property. As used herein, a security property represents an attribute identifiable with a synthesis routine and/or a local compute resource that represents a security condition. For example, a security property may specify the class of devices allowed to access the local compute resource and/or synthesis routine (e.g., access data on a local compute resource that is categorized by the security property) and/or a class of requests allowed to access to the local compute resource (e.g., a class of synthesis routines that access a particular type of data). As used herein, a management property represents an attribute identifiable with a synthesis routine and/or a local compute resource that represents a management condition. For example, a management property may define classes of data, specify the class of data associated with a sensor, specify the class of data associated with an operation performable on a set of data, and/or other organizational classification of data, synthesis routine, and/or local compute resource, Example data properties include properties of data related to size, attributes, statistical variations (mean, standard deviations, etc.), time covered, and the like. For example, a profile may be associated with a data set, where the profile describes the data using data properties (e.g., the profile is a data structure including a variable for a descriptive data property).

The interface engine 106 may represent circuitry or a combination of circuitry and executable instructions that when executed cause the circuitry to provide an interface that allows a synthesis routine to be submitted to the system 100 and identify the operation conditions for the synthesis routine. In this manner, the system 100 may utilize the interface engine 106 to facilitate creation and management of synthesis routines to use with sensor data, in particular sensor data within a local environment. As used herein, operation conditions represent the parameters used to perform a synthesis routine. Example operation conditions include a data type used by the synthesis routine and an anonymity threshold condition that defines a limit to when the synthesis routine is allowed to use raw data from the resource group (e.g., a proximity threshold, a class of analysis, a result size, a data property, and the like). The operation conditions may be described in a data structure such as a synthesis routine data structure including a first variable to describe a data type and a second variable to describe an anonymity threshold condition.

The analysis engine 110 represents any circuitry or combination of circuitry and executable instructions to execute a synthesis routine based on an analysis request. For example, the analysis request may include parameters to perform a synthesis routine, such as the data types to use, the boundaries for amount of data to use, and the class of result to provide from completing the synthesis routine. For another example, the analysis engine 110 may execute a synthesis routine based on a comparison of the class of synthesis routine and an access term associated with an authorization level of the analysis request. For example, the analysis engine 110 may be a combination of circuitry and executable instructions that when executed by the circuitry cause the circuitry to select a synthesis routine based on the analysis request, identify data stored in a resource group based on the synthesis routine, and cause the synthesis routine to perform using raw data in the resource group based on a data property in response to a determination that the analysis request is authorized to access the resource group.

The analysis engine 110 may represent circuitry or a combination of circuitry and executable instructions that when executed cause the circuitry to identify a data type within a resource group. For example, the analysis engine 110 may represent a combination of circuitry and executable instructions that identifies a data property of the analysis request, compare the data property of a data type within a local compute resource of a resource group, and retrieve the data from the local compute resource based on the comparison of the data property of the analysis request and the data on the local compute resource. The analysis engine 100 may utilize data associated with separate resource groups or distributed across devices or local compute resources. For example, the analysis engine 110 may identify a first group of data from a first sensor and a second group of data from a second sensor (such as by identifying data types associated with a data property and discovering those data types in the first group of data and the second group of data) and performing a forward projection based on the first group of data and the second group of data. A forward projection, as used herein, represents any operation performed to determine a future event or future data. For example, the operation conditions of a forward projection synthesis routine may identify data by a timestamp data property and extrapolate from a pattern of historical sensor data within a time interval to identify a future period associated with the time interval to predict how the sensor data may be result during the future period.

For another example, an ink consumption sensor, a digital camera, and an emailing tool may be within a local processing environment. In that example, an ink consumption sensor in an at-home printer is an IoT device under management that reports remaining inks available in the printer; a digital camera (e.g., a mobile device camera) is another IoT device under management that uploads photos to the management system; and an e-mailing tool is another IoT device under management that uploads documents to the system for management. Further in that example, a synthesis routine may examine the historical records of the size of the uploaded photos, uploaded documents, and the ink consumptions to automatically draw correlation and save the correlation in an internal storage resource of, for instance, the printer, where the printer provides services, such as photo printing and document printing, with a tunable weight factor using the correlation. Further, an ink consumption predictive formula can be automatically generated by the synthesis routine. An example of such predictive formula may be, based on historical observation of photo uploading events and e-mail upload events, generate a likelihood assessment that the printer will be out of printing fluid. When this likelihood crosses a threshold, for example, 80% consumption, a communication (e.g., a message or signal) is sent to an ink subscription service and/or to a user through the printer control panel.

For yet another example, a sensor-enabled refrigerator may report a current snapshot of the food and produce inside as well as the rate of consumption based on a historical record. This data (e.g., the historical record) may be linked to (or otherwise associated with) another IoT device under management that monitors the daily activity and energy consumption. A synthesis analysis based on these two data streams may serve the user to predict the health status of the user at a future time, and generate recommendation for modulating the user behavior for better health.

The analysis engine 110 may represent circuity or a combination of circuity and executable instructions that when executed cause the circuitry to maintain performance of synthesis routines. For example, the analysis engine 110 may be a combination of circuitry and executable instructions that when executed cause the circuitry to monitor analysis requests and prioritize demand of the synthesis routines based on a data property and/or access term. Prioritization may be based on a level of demand as well as terms for access of each request. For example, the analysis engine 110 may prioritize access requests to a synthesis routine based on a demand level identified by monitored analysis requests and access terms associated with the monitored analysis requests. For another example, prioritization could be based on payment type (such as pricing classes or auction) or source type (e.g., the class of the source could be preferred or basic).

The analysis engine 110 may manage the analysis requests based on access terms. As used herein, access terms represent conditions and limitations for use as set by an agreement between entities, such as a host device that hosts a synthesis routine and a source of an analysis request. For example, the analysis engine 110 may establish access terms for executing an analysis request made by an IoT device and establish a resource stack of a platform as a service (PAAS) infrastructure model based on the access terms. The analysis engine 110 may facilitate provisioning of the results of a synthesis routine based on the level of authorization and/or the access terms. For example, the analysis engine 110 may select a synthesis routine based on whether the source is within the proximity threshold and provide an anonymous result to a destination (such as a cloud-based service) in response to performance of the synthesis routine with non-anonymized data when the destination is outside the proximity threshold in accordance with the access terms. In another example, the analysis engine 110 may execute a synthesis routine to perform on data from multiple sensors and may send an anonymized result to a cloud-based storage location. When the remote device that requests the analysis results satisfies the appropriate authorization level (e.g., the remote device is within the proximity threshold and the access terms indicate the remote device is authorized to receive the result of the synthesis routine), personal identifiable information or a result provided based on personal identifiable information may be provided to the remote device in response to execution of the synthesis operation. Personal identifiable information (or a personal identifiable result discussed herein) includes information that is raw or otherwise not anonymized.

Figure 3:
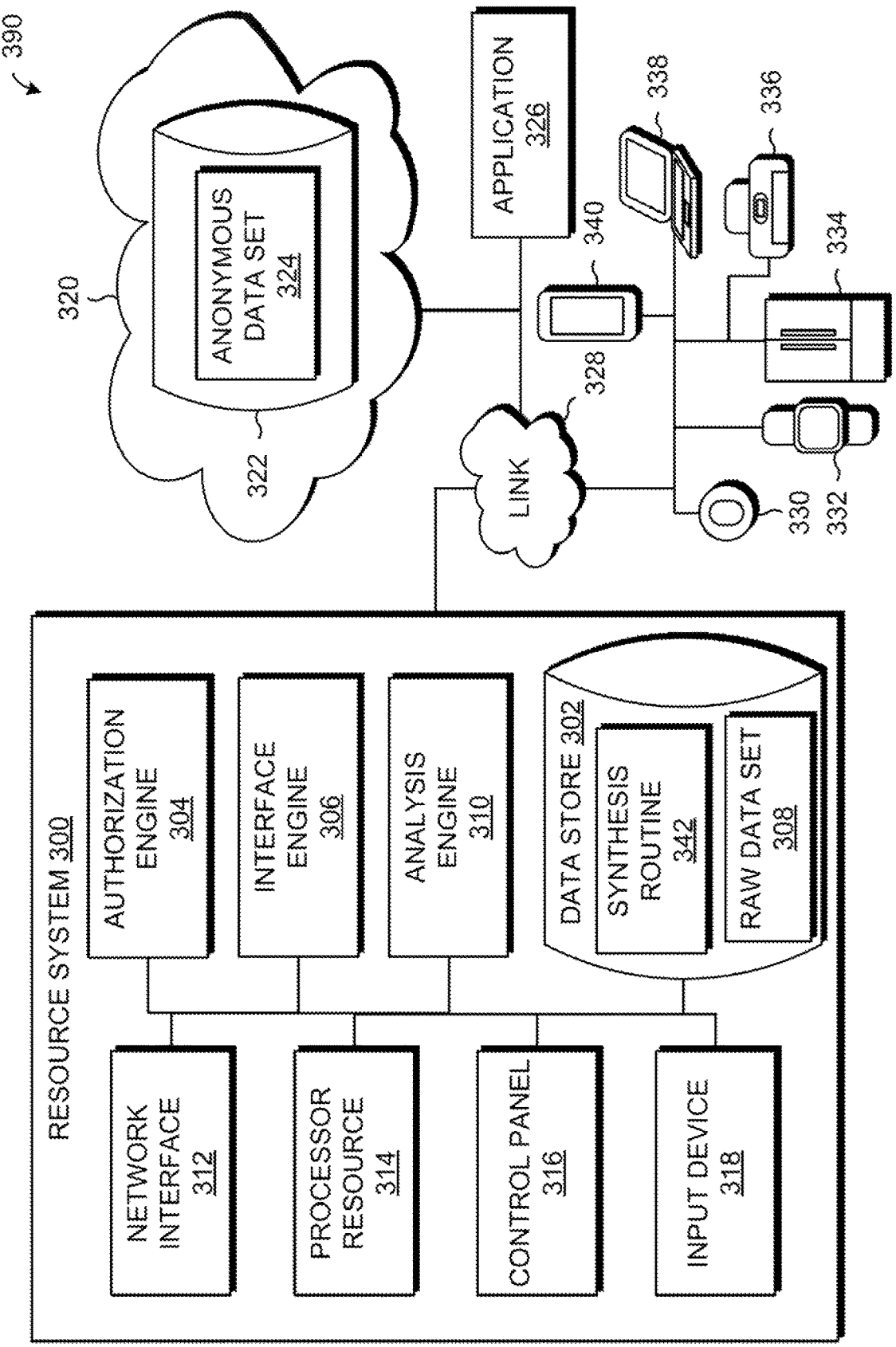
FIG. 3 depicts an example environment in which various resource systems may be implemented.
Figure 4:
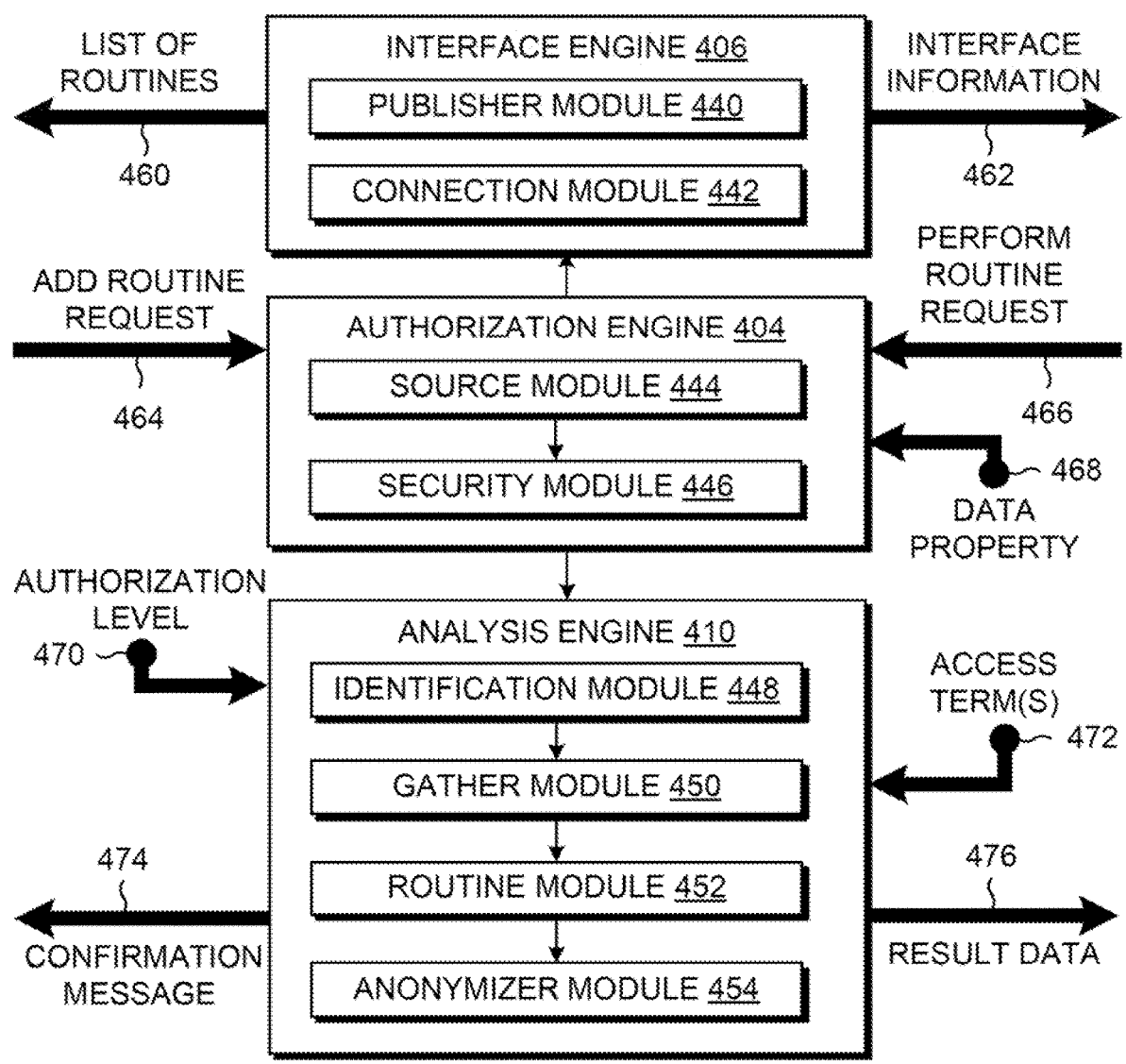
FIG. 4 depicts example modules used to implement example resource systems.
Figure 5:
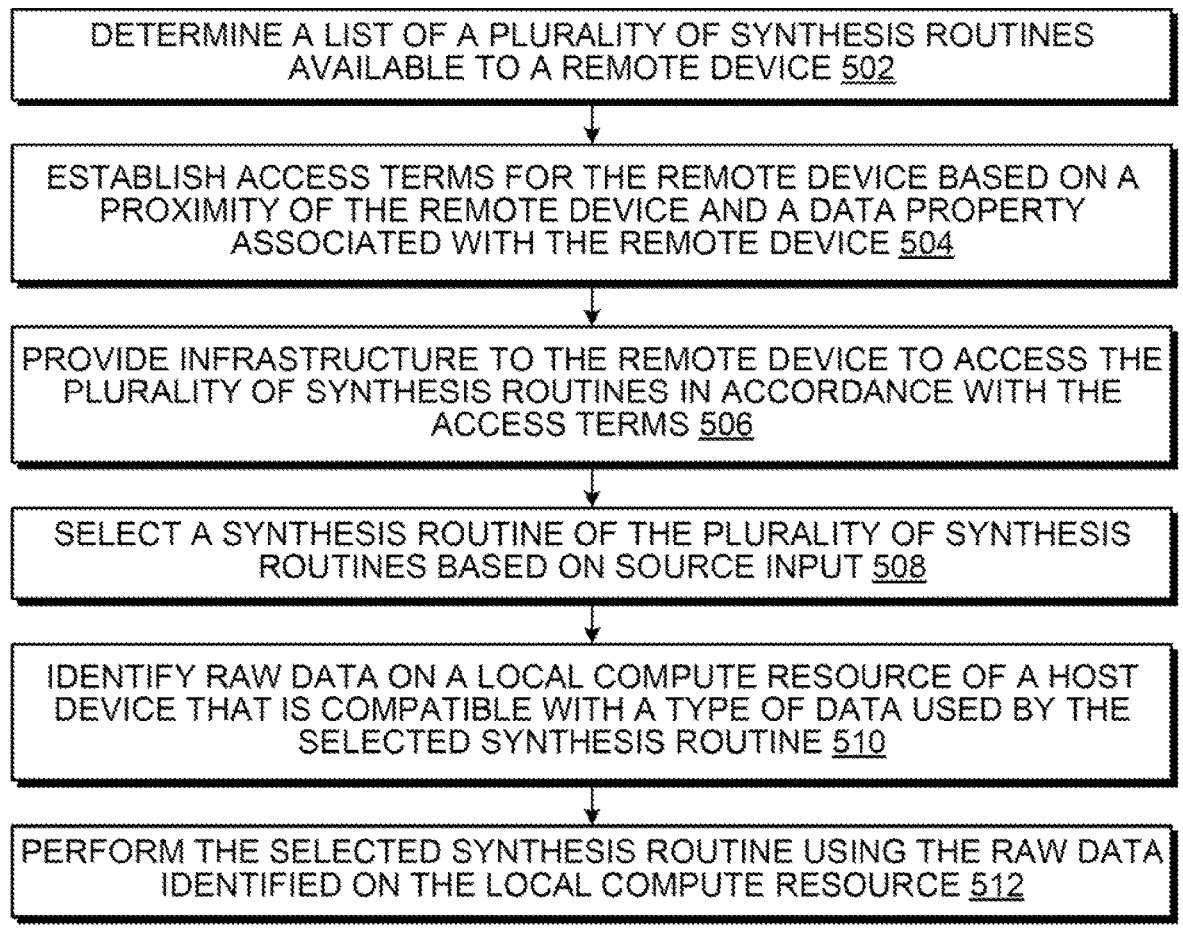
FIGS. 5 and 6 are flow diagrams depicting example methods for providing access to a result of a synthesis routine.
Figure 6:
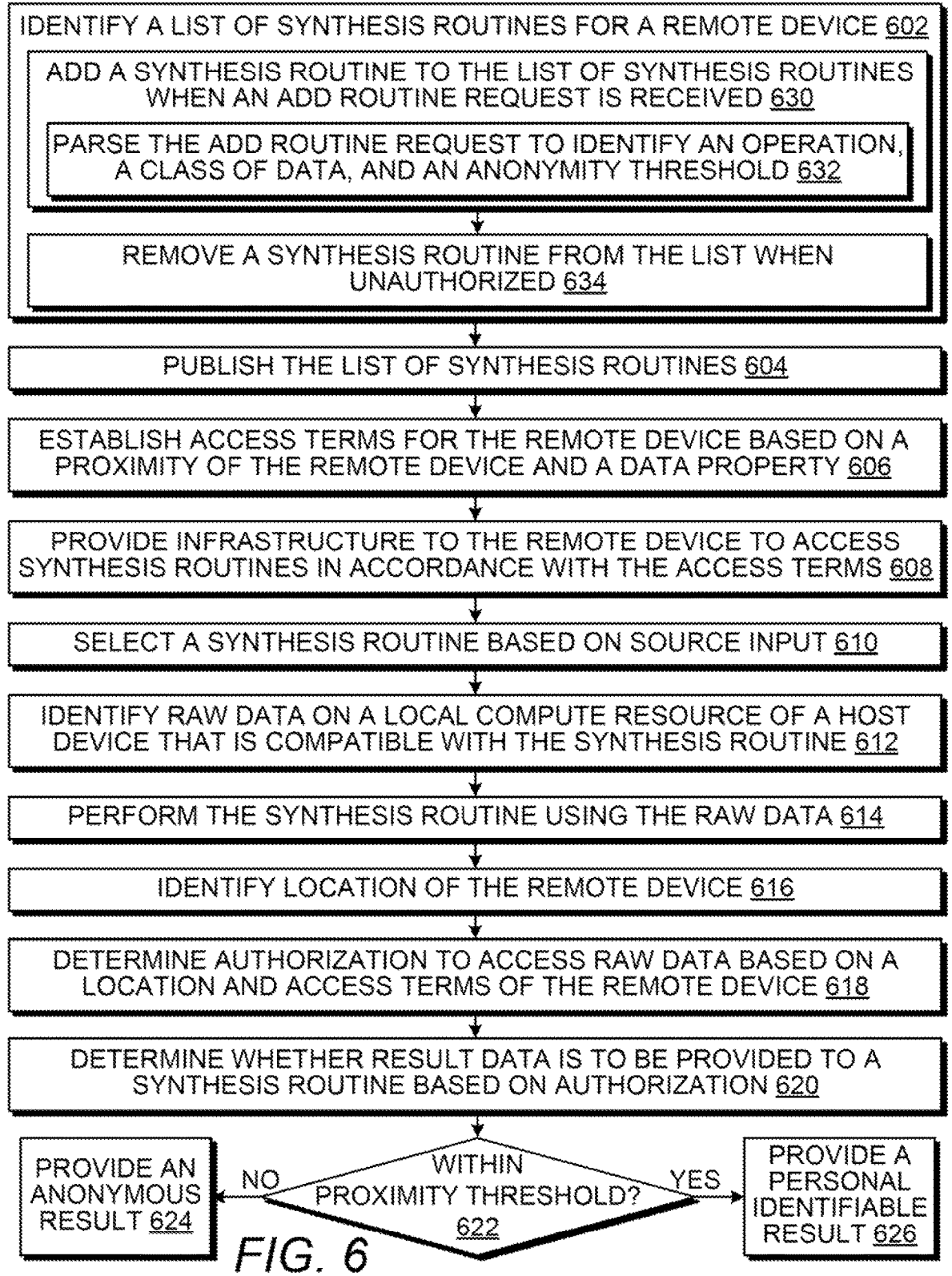

In some examples, functionalities described herein in relation to any of FIGS. 1-3 may be provided in combination with functionalities described herein in relation to any of FIGS. 4-6.

FIG. 2 depicts the example system 200 may comprise a memory resource 220 operatively coupled to a processor resource 222, Referring to FIG. 2, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as an authorization module 204, an interface module 206, and an analysis module 210. The authorization module 204, the interface module 206, and the analysis module 210 represent program instructions that when executed function as the authorization engine 104, the interface engine 106, and the analysis engine 110 of FIG. 1, respectively. The processor resource 222 may carry out a set of instructions to execute the modules 204, 206, 210, and/or any other appropriate operations among and/or associated with the modules of the system 200. For example, the processor resource 222 may carry out a set of instructions to publish a list of synthesis routines of a compute device and a list of data types compatible with the synthesis routines to a device within a proximity range of the compute device (e.g., a list of synthesis routines may be publishable by broadcasting the list of synthesis routines to devices within the proximity range of the compute device, such as a compute device hosting a local compute resource of the resource group used by the synthesis routine). For another example, the processor resource 222 may carry out a set of instructions to, in response to an analysis request, select a first synthesis routine of a list of synthesis routines based on input from a source of the analysis request (e.g., parameters of the analysis request), identify data of a local compute resource with a data property associated with the first synthesis routine, and performing the first synthesis routine using raw data from the local compute resource in response to a determination that a destination of the analysis request is authorized to receive a result with personal identifiable information. For yet another example, the processor resource 222 may carry out a set of instructions to enable receipt of a synthesis routine data structure that defines a second synthesis routine, add the second synthesis routine to the list of synthesis routines, establish access terms to a device (e.g., a device hosting the synthesis routine and/or local compute resources for the synthesis routine), establish a resource stack of a PAAS infrastructure model based on the access terms, provide access to the list of synthesis routines via the resource stack, prioritize analysis requests based on a demand level identified by monitored analysis requests and access terms associated with the monitored analysis requests, and send a result with anonymized information to a remote memory location (e.g., a cloud-based location) in accordance with the access terms.

Although these particular modules and various other modules are illustrated and discussed in relation to FIG. 2 and other example implementations, other combinations or sub-combinations of modules may be included within other implementations. Said differently, although the modules illustrated in FIG. 2 and discussed in other example implementations perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules. FIG. 4 depicts yet another example of how functionality may be organized into modules.

A processor resource, such as processor resource 222, is any appropriate circuitry capable of processing (e.g., computing) instructions, such as one or multiple processing elements capable of retrieving instructions from a memory resource, such as memory resource 220, and executing those instructions. For example, the processor resource 222 may be a CPU that enables providing access to a result of a synthesis routine by fetching, decoding, and executing modules 204, 206, and 210. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). The processor resource 222 may include multiple processing elements that are integrated in a single device or distributed across devices. The processor resource may process the instructions serially, concurrently, or in partial concurrence.

A memory resource, such as memory resource 220, represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. The memory resource 220 may be said to store program instructions that when executed by the processor resource 222 cause the processor resource 222 to implement functionality of the system 200 of FIG. 2. The memory resource 220 may be integrated in the same device as the processor resource 222 or it may be separate but accessible to that device and the processor resource 222. A memory resource may be distributed across devices.

In the discussion herein, the engines 104, 106, and 110 of FIG. 1 and the modules 204, 206, and 210 of FIG. 2 have been described as circuitry or a combination of circuitry and executable instructions. Such components may be implemented in a number of fashions. Looking at FIG. 2, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on the memory resource 220 may comprise any set of instructions to be executed directly (such as machine code) or indirectly (such as a script) by the processor resource 222.

In some examples, the system 200 may include the executable instructions may be part of an installation package that when installed may be executed by the processor resource 222 to perform operations of the system 200, such as methods described with regards to FIGS. 4-6. In that example, the memory resource 220 may be a portable medium such as a compact disc, a digital video disc, a flash drive, or memory maintained by a computer device, such as a server, from which the installation package may be downloaded and installed. In another example, the executable instructions may be part of an application or applications already installed. The memory resource 220 may be a non-volatile memory resource such as read only memory (ROM), a volatile memory resource such as random access memory (RAM), a storage device, or a combination thereof. Example forms of a memory resource 220 include static RAM (SRAM), dynamic RAM (DRAM), electrically erasable programmable ROM (EEPROM), flash memory, or the like. The memory resource 220 may include integrated memory such as a hard drive (HD), a solid state drive (SSD), or an optical drive.

FIG. 3 depicts example environments in which various example resource systems may be implemented. The example environment 390 is shown to include an example resource system 300 for providing access to local compute resources. The system 300 (described herein with respect to FIGS. 1 and 2) may represent generally any circuitry or combination of circuitry and executable instructions to manage access to local compute resources. The system 300 may include an authorization engine 304, an interface engine 306, and an analysis engine 310 that are the same as the authorization engine 104, the interface engine 106, and the analysis engine 110 of FIG. 1, respectively, and the associated descriptions are not repeated for brevity. The engines 304, 306, and 310 may be integrated into a compute device, such as compute devices 330-340 discussed further below. The engines 304, 306, and 310 may be integrated via circuitry or as installed instructions into a memory resource of the compute device.

The resource system 300 of FIG. 3 is shown comprising resource components, such as a network interface 312, a processor resource 314, a control panel 316, an input device 318, and a data store 302. The resource components may be provided as usable local compute resources and/or may be used by the system 300 to perform operations associated with providing access to a result of a synthesis operation. For example, the processor resource 314 may be allocated to devices 330 and 332 to perform computations related to location tracking, the result may be stored in data store 302, and information to retrieve the result may be sent to an application 326 requesting the result of the synthesis request. For another example, the control panel 316 may be requested by an IoT thermostat to be used as an external display to provide a user interface for the IoT thermostat, where such a user interface may allow both a user to send commands to the IoT thermostat and for the IoT thermostat to alert a user of the occurrence of an event and/or action recommendation. For yet another example, the network interface 312 may be used to connect to a compute device, such as compute devices 330-340, and bridge a capability from a first compute device to a second compute device via the resource system 300.

The data store 302 is a memory resource as discussed herein. The data store 302 may maintain a list of synthesis routines (e.g., a list including synthesis routine 342) and a "pool" of raw sensor data (shown as raw data set 308 in FIG. 3) from sensors within proximity threshold of the resource system 300. For example, sensors, such as sensors included with compute devices 330-340, may be connected and authorized to store raw sensor data in data store 302 based on the sensors proximity to the resource system 300. The data store 302 may contain information utilized by the engines 104, 106, and 110 and/or local compute resources, such as resource components 312-318.

The resource system 300 may include a control panel 316 and an input device 318. The control panel 316 provides access to the data on the local compute resources of the resource system 300 (which may be, for example, part of a resource group used by the synthesis routine 342). The control panel 316 may provide access to a result of a synthesis routine by selecting input associated with the synthesis routine (e.g., select the synthesis routine in a displayed list of routines) and, in response to the selection, display the result on the control panel 316. The input device 318 converts information (e.g., physical information stored on paper media) into digital information stored on a local compute resource of the resource system 300 in a format of a data type used by the synthesis routine 342. The control panel 316 and input device 318 may offer a way to manually enter data into and/or retrieve data from the data store 302, such as through assistance of an application. For example, the input device 318 may be a scanner to scan a list of items for a recipe or a receipt, that when added to the pool of raw sensor data may allow a refrigerator 334 to update a list of contents in the refrigerator 334.

The example environment 390 may include compute devices, such as IoT devices 330-340. The IoT devices represent generally any compute devices to communicate a network request and receive and/or process the corresponding responses. For example, a browser application may be installed on the user device 338 to receive the network packet from the resource system 300 and utilize the payload of the packet to display an element of a page via the browser application. In general, an IoT device refers to a physical object embedded with electronics, software, sensors, and/or connectivity (e.g., network connectivity or device-to-device connectivity) that enables the object to collect and exchange data. Example IoT devices include stationary devices (such as a connected thermostat 330, a refrigerator 334, a printer 336, etc.) and mobile devices (such as a notebook computer 338, a cell phone 340, a watch 332, etc.). An IoT device may include a device with a singular purpose, such as a temperature sensor, a motion detector, a door switch, etc. or mufti-purpose devices such as printers, wireless access points, or thermostats. An IoT device with a singular function may, by utilizing the example architecture and/or example methods of operations described herein, leverage the more complex device nearby that may have more local compute resources in comparison to the resources provided on the singular purpose device.

The compute devices may be located on separate networks or part of the same network. The proximity threshold may be determined based on the network of compute devices. Data and capabilities from the compute devices and/or the resource system 300 may be accessed by and/or provided to a cloud-based service, such as a cloud-based service offered on network 320. The example environment 390 may include any appropriate number of networks 320 and any number of the networks 320 may include a cloud compute environment. A cloud compute environment may include a virtual shared pool of compute resources. For example, networks 320 may be distributed networks comprising virtual computing resources. Any appropriate combination of the system 300 and compute devices may be a virtual instance of a resource of a virtual shared pool of resources. The engines and/or modules of the system 300 herein may reside and/or execute "on the cloud" (e.g., reside and/or execute on a virtual shared pool of resources). The data provided to the cloud-based service may be anonymized data (shown as anonymous data set 324 stored on a data store 322 of the cloud-based service).

An application 326 may request data and/or an analysis service from the compute devices and may be offered access to the anonymous data set 324. The application 326 may request access to the raw data set 308, and may be provided requested data from the raw data set 308 when authorized by the authorization engine 304. For example, if the application 326 is being executed on a watch compute device 332 and the watch compute device 332 has a confirmed location within the proximity threshold (as identified by the authorization engine 304), then the interface engine 306 may provide the interface to access a result of performing the synthesis routine 342 on the raw data set 308 on the local compute resource (e.g., the data store 302) as determined by the access terms associated with the watch compute device 322 (as identified by the analysis engine 310).

A link 328 generally represents one or a combination of a cable, wireless connection, fiber optic connection, or remote connections via a telecommunications link, an infrared link, a radio frequency link, or any other connectors of systems that provide electronic communication. The link 328 may include, at least in part, intranet, the Internet, or a combination of both. The link 328 may also include intermediate proxies, routers, switches, load balancers, and the like.

Referring to FIGS. 1-3, the engines 104, 106, and 110 of FIG. 1 and/or the modules 204, 206, and 210 of FIG. 2 may be integrated into a single device, such as a compute device comprising the resource components of the resource system 300, or distributed across devices, such as devices 330-340. The engine and/or modules may complete or assist completion of operations performed in describing another engine and/or module. For example, the analysis engine 310 of FIG. 3 may request, complete, or perform the methods or operations described with the analysis engine 110 of FIG. 1 as well as the authorization engine 104 and the interface engine 106 of FIG. 1. Thus, although the various engines and modules are shown as separate engines in FIGS. 1 and 2, in other implementations, the functionality of multiple engines and/or modules may be implemented as a single engine and/or module or divided in a variety of engines and/or modules. In some example, the engines of the system 300 may perform example methods described in connection with FIGS. 4-6.

FIG. 4 depicts example modules used to implement example resource systems. Referring to FIG. 4, the example modules of FIG. 4 generally include executable instructions to operate an authorization engine 404, an interface engine 406, and an analysis engine 410 that are similar to the authorization engine 104, the interface engine 106, and the analysis engine 110 of FIG. 1, and their respective descriptions are not repeated in their entirety. The example engines and modules of FIG. 4 may be implemented on a compute device, such as an office server, a home wireless router, or a printer.

Services may be offered by the system via the interface engine 406. The interface engine 406 may include program instructions, such as a publisher module 440 and a connection module 442, to facilitate offering analysis services to a device within the proximity threshold. For example, the interface engine 406 may publish a list 406 of synthesis routines, local compute resources available, data types, and/or interface information 462 to devices within a proximity threshold of the host compute device. The publisher module 440 represents program instructions that when executed by a processor resource cause the processor resource to publish information (e.g., the list 460 of routines, data types maintained on a local compute resource, interface information 462, information to access a PAAS container, etc.), such as, for example, by sending a broadcasted message to devices within a range of an antenna coupled to the host device. The connection module 442 represents program instructions that when executed by a processor resource cause the processor resource to provide interface information 462 to a device that requests access to a synthesis routine, such as an analysis service published via the publisher module 440. The interface information 462 may be a uniform resource locator (URL), infrastructure location, a connection method, a connection confirmation, or any other appropriate information to facilitate interfacing a host device with a destination, such as an IoT device or a cloud-based service application.

Requests to access local compute resources may be received by the authorization engine 404 of the system. For example, an add routine request 464 (to add a synthesis routine to the list 460 of available synthesis routines) and/or a perform routine request 466 (to cause execution of a synthesis routine) may be received by the authorization engine 404. The authorization engine 404 may include program instructions, such as a source module 444 and a security module 446, to facilitate determining an authorization level of an analysis request (e.g., the authorization level of a source of an add routine request or a destination of a perform routine request 466) and/or assigning a data property to the analysis request. The source module 444 represents program instructions that when executed by a processor resource cause the processor resource to identify the source of the analysis request. The security module 446 represents program instructions that when executed by a processor resource cause the processor resource to assign a data property 468 to the access request based on the context of the request. For example, a device making a request may have limited authorization (such as a time limit) to access the result of the synthesis routine and the data property is an identifier that represents the access limitation. For another example, the application requesting execution of a synthesis routine may have authorization to execute the synthesis routine with a limitation of only using anonymized data to perform the synthesis routine as represented by a data property associated with the analysis request and/or the source of the request. For yet another example, the authorization engine 404 may identify data of the result of the perform routine request 466 to be stored at the local compute resource and the identified data may be associated with the data property 468 to limit retrieval by compute devices (e.g., authorize some device to the raw version of the result and authorize other devices to the anonymized version of the result).

The analysis engine 410 may include program instructions (e.g., an identification module 448, a gather module 450, a routine module 452, and an anonymizer module 454) to facilitate management of the local compute resources. For example, the analysis engine 410 may invoke program instructions to identify and select a synthesis routine from a list of available synthesis routines based on an analysis request, determine an authorization level 470 of the analysis request, and assign access rights to the synthesis routine of the analysis request and/or the result of the synthesis routine request based on a comparison of the data property of the synthesis routine and an access term associated with the authorization level associated with the analysis request. An authorization level is associated with a degree of permissions to access the local compute resources and may be determined based on the type of request, the source of the request, the destination of the request, the expected results of the request, the proximity threshold, access terms of agreements for services offerable by the host device, and/or other security factors.

The identification module 448 represents program instructions that when executed by a processor resource cause the processor resource to identify a synthesis routine of the analysis request (e.g., select the synthesis routine that performs the analysis request according the operation conditions of the analysis request). For example, data properties of the synthesis routines may be compared to the data property of the request and a synthesis routine with a matching data property may be selected by an analysis engine 410 when executing the identification module 448.

The gather module 450 represents program instructions that when executed by a processor resource cause the processor resource to gather data associated with the analysis request. For example, the gather module 450 may be executed to cause the analysis engine 410 to compare a data property to data on a local compute resource and an access term 472 to identify and retrieve the data to be used with the synthesis routine. For another example, the gather module 450 may be executed to cause the analysis engine 410 to gather the operation conditions (e.g., parameters) for the synthesis routine as preparation to store a synthesis routine for later retrieval by the system.

The routine module 452 represents program instructions that when executed by a processor resource cause the processor resource to perform the analysis request, such as execute the synthesis routine and assistive operations to complete performance of the synthesis routine. For example, the analysis request may be associated with a data property 468 and the source of the analysis request is associated with an authorization level based on an access term (or terms) 472, the data property 468 is compared to the permissions associated with the authorization level, and if the data property 468 satisfies (e.g., is within the permitted operations) then the analysis engine 410 allows the synthesis routine to be added to the list of synthesis routines or performed as indicated by the analysis request (e.g., 464 or 466).

The anonymizer module 454 represents program instructions that when executed by a processor resource cause the processor resource to provide anonymous data to a destination. For example, execution of the anonymizer module 454 may retrieve anonymous data in lieu of raw sensor data when the authorization level does not satisfy the access term 472 or may convert the raw sensor data to an anonymized version prior to sending the data to the destination.

In response to execution of the analysis engine 410, a message may be sent in response to a resource request received by the system. For example, a confirmation message 474 may be sent to a source of the add routine request 464. For another example, a communication including the result data 476 of the performed synthesis routine may be sent to a source of the perform routine request 466.

FIGS. 5 and 6 are flow diagrams depicting example methods for providing access to local compute resources. Referring to FIG. 5, example methods for providing access to a result of a synthesis routine may generally comprise determining a list of a plurality of synthesis routines available to a remote device, establishing access terms for a remote device, providing an infrastructure to the remote device to access a synthesis routine in accordance with the access terms, selecting a synthesis routine of the plurality of synthesis routines based on source input, identifying raw data on a local compute resource of the host device that is compatible with the selected synthesis routine, and performing the selected synthesis routine using the raw data. The operations discussed with respect to FIG. 5 are performable by the system comprising an authorization engine, an interface engine, and an analysis engine, such as system 100 of FIG. 1.

At block 502, a list of a plurality of synthesis routines available to a remote device are determined. For example, an interface engine may identify the compute devices connected to a host device. A compute device, such as a host device, determines the synthesis routines that are available to use by a remote device (e.g., based on location of the remote device or terms of a service subscription) and compiles a list of the available synthesis routines, such as by executing an interface engine and/or authorization engine. For example, a data store containing services that are identified as available may be broadcasted to devices within a proximity threshold of the host device (e.g., via a personal area network broadcast).

At block 504, access terms for the remote device are established based on a proximity of the remote device and a data property associated with the remote device. For example, an analysis engine, such as analysis engine 110, may identify permissions authorized to be performed by an application that allow storage and/or retrieval of a synthesis routine and associate a data property that represents the level of access with the remote device. For another example, the remote device may revoke all access permission when the remote device goes beyond the proximity threshold. In this manner, devices associable with the network within the proximity threshold may, for example, access the synthesis routines according to dynamic and adaptive security protocols.

At block 506, an infrastructure is provided to the remote device. For example, an interface engine, such as interface engine 106 of FIG. 1, may provide the infrastructure identified by the analysis engine to a destination of the analysis request. The infrastructure provided at block 506 provides access to the plurality of synthesis routines in accordance with the access terms. For example, a personal area network pairing with limitations made by the access terms may be initiated and allow access to the synthesis routines associated with the analysis request. For another example, a PAAS container may be provided with the access terms implemented as providing or not providing particular infrastructure to enable capabilities associated with the access terms.

At block 508, a synthesis routine is selected. For example, add routine requests, modify routine requests, and remove routine requests are managed by a host compute device, such as via an analysis engine, to determine the list of available synthesis routines and a synthesis routine of the list of the plurality of synthesis routines is selected based on the compatibility of the selected synthesis routine with the analysis request. The compute device accounts for authorization level of the requests (e.g., access terms agreed to by the source of the request) and the type of request (e.g., the type of resources used by the synthesis routine being requested, the amount of the resource being requested, etc.) when determining how to allocate resources and otherwise perform the operations of the analysis request. Input may be received via an application or display interface, such as a user selecting an entry from a list of entries displayed on a control panel.

At block 510, raw data compatible with the synthesis routine selected at block 508 is identified on a local compute resource. For example, a parameter of a synthesis routine may be used by an analysis engine to identify the type of data used by the synthesis routine and that parameter may be compared to the data types of data in a resource group hosted by the host device. In accordance with an authorization level and/or access terms, raw data may be provided to a synthesis routine or anonymized data may be provided to a synthesis routine. Anonymous data, by definition, examples data with reduced information, thus, a synthesis routine that uses raw data may have more accurate results in comparison to a synthesis routine that uses anonymized data. At block 512, the selected synthesis routine is performed based on the raw data identified at block 510. In this manner, the most accurate result of the synthesis routine may be accomplished and may be kept private when performed within a local environment.

A host device performing the operations discussed with respect to FIG. 5 may manage a pool of compute resources and offer the data in the pool to synthesis routines for analysis requests made by nearby devices (e.g., devices within a proximity threshold) in accordance with agreements to provide the analysis services. In this manner, the host device may manage access to results of synthesis routines to an IoT device by managing access in accordance with access terms associated with a lease agreement and by proximity to the host device. One example benefit of hosting local compute resources allows for raw data (e.g., non-anonymous data) to be accessible by synthesis routines requested by devices to produce a smart local environment that is able to exchange information, such as forward projections, between trusted devices without exposing private data (e.g., non-anonymous data) to access from third parties beyond the proximity threshold.

FIG. 6 includes blocks similar to blocks of FIG. 5 and provides additional blocks and details. In particular, FIG. 6 depicts additional blocks and details generally regarding managing the list of synthesis routines, publishing the list of local compute resources, identifying the location of the remote device, determining authorization, and determining the class of result in response to executing the synthesis routine. Blocks 602, 606, 608, 610, 612, and 614 are the similar to blocks 502, 504, 506, 508, 510, and 512 of FIG. 5 and, for brevity, their respective descriptions are not repeated in their entirety.

At block 602, a list of synthesis routines may be identified as available to a remote device. The list of synthesis routines may be managed by an interface engine, such as interface engine 106 of FIG. 1. Synthesis routines may be added to the list of synthesis routines at block 630. For example, a synthesis routine may be added to the list of synthesis routines by an interface engine when an add routine request is received by the host device with a synthesis routine data structure. In that example, the add routine request is parsed by an interface engine (e.g., the storage variables of the synthesis routine data structure are accessed) is at block 632 to identify an operation, a class of data useable by the operation, and an anonymity threshold condition (e.g., to identify when raw data is allowed to be used with the operation or when the anonymous data is to be used with the operation). At block 634, a synthesis routine may be removed from the list of synthesis routines. For example, an authorization engine may identify that a synthesis routine is associated with an authorization level above the authorization level of the source of the request and the synthesis routine may not appear as available to the source. For another example, a synthesis routine from the list of the plurality of synthesis routines when the remote device requesting the analysis request is outside the proximity range.

At block 604, the list of synthesis routines determined (e.g., identified as available) at block 602 are published. The list of synthesis routines may be published passively (e.g., to a web page or a public interface destination) or actively (e.g., send communication to a maintained list of devices in a network). For example, the list of synthesis routines may be published via an interface engine by sending scheduled broadcasts to devices within wireless range of the host device. For another example, a device may receive the list of synthesis routines in response establishing a connection to an office network.

At block 618, a determination as to whether the remote device is authorized to access raw data is made based on a location of the remote device and an access term associated with the remote device. For example, the location of the device identified at block 616 is compared by an authorization engine to the proximity threshold and the access terms are compared to data property of the analysis request to determine whether the analysis request is authorized to access raw data to perform the synthesis routine. At block 620, a determination as to whether the data is to be provided to the synthesis routine is made by an analysis engine based on the determination at block 618. The location of the remote device is compared to the proximity threshold at block 622. If the remote device is outside the proximity range of the host device, an anonymous result is selected to be provided (e.g., stored or sent) at block 624. If the remote device is within the proximity range, a personal identifiable result is selected to be provided (e.g., stored or sent) at block 626.

Although the flow diagrams of FIGS. 4-6 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present description.

All of the features disclosed in this specification (including any accompanying claims, abstract and drawings), and/or all of the elements of any method or process so disclosed, may be combined in any combination, except combinations where at least some of such features and/or elements are mutually exclusive.

The present description has been shown and described with reference to the foregoing examples. It is understood, however, that other forms, details, and examples may be made without departing from the spirit and scope of the following claims. The use of the words "first," "second," or related terms in the claims are not used to limit the claim elements to an order or location, but are merely used to distinguish separate claim elements.

What is claimed is:

1. A method comprising:
identifying, by a processor, a class of devices and a type of compute resource associated with a request;
determining, by the processor and based on the class of devices, a collection of compute resources distributed across a number of devices having the type of compute resource;
determining, by the processor, a class of data based on a data property of the request; and
causing, by the processor, the number of devices corresponding to the class of devices to perform a synthesis routine using data corresponding to the class of data.

2. The method of claim 1, further comprising:
providing, by the processor, access to a local compute resource to the number of devices having the class of devices associated with the request.

3. The method of claim 1, further comprising:
determining, by the processor, that the request utilizes generation of a group event;
generating, by the processor, a number of clusters for the request, the clusters associated with the type of compute resource; and
sending, by the processor, a portion of the request to each cluster to perform the portion with the type of compute resource.

4. The method of claim 1, further comprising:
establishing, by the processor, a time limit in which to use the type of compute resource.

5. The method of claim 1, further comprising:
establishing, by the processor, a time restriction of a network resource, a number of destinations that are restricted from receiving a result of an operation of the synthesis routine outside of the time restriction.

6. The method of claim 1, further comprising:
prioritizing, by the processor, analysis requests based on a demand level identified by monitored analysis requests; and
prioritizing, by the processor, sending a result of an operation of the synthesis routine from the number of devices to a remote memory storage location.

7. The method of claim 1, wherein the class of devices represents a combination of processor resources, memory resources, and network resources.

8. An apparatus comprising:
a processor; and
a memory resource storing instructions that are executable by the processor to:
publish a list of routines to a device within a boundary of a local environment, the list of routines usable with local compute resources within the local environment; and in response to selection of a first routine of the list of routines:
identify a local compute resource within the local environment having a data property associated with the first routine; and
either:
perform the first routine using the local compute resource in response to determining that a destination that is to receive a result of the first routine is within the local environment; or
send the first routine to a number of devices having a compute resource corresponding to the data property associated with the first routine, the data property representing a class of devices.

9. The apparatus of claim 8, wherein the instructions are executable by the processor to further:
provide access to analysis capabilities associated with the class of devices; and
provide access to compute resources associated with the class of devices.

10. The apparatus of claim 8, wherein:
the data property is a time restriction in which to utilize the local compute resource within the local environment having the data property associated with the first routine.

11. The apparatus of claim 10, wherein:
the local compute resource within the local environment having the data property associated with the first routine is a network resource, and
the instructions are executable by the processor to further:
generate the result of the first routine; and
cause transfer of the result of the first routine within the time restriction corresponding to use of the network resource.

12. The apparatus of claim 8, wherein:
the first routine is sent to the number of devices based on a match between a class of devices of the number of devices and a class of devices corresponding to a type of compute resource associated with the first routine.

13. The apparatus of claim 8, wherein the instructions are executable by the processor to further:
prioritize a performance of the first routine based on a demand level identified by monitored requests; and
prioritize communication of a result of first routine based on a demand level and an operation restriction defined by a time-based policy.

14. A non-transitory machine-readable medium comprising a set of instructions executable by a processor to:
identify a type of data of a request;
determine a type of compute resource to use with an operation of the request corresponding to the type of data of the request;
identify a device with the type of compute resource determined for the operation of the request;
cause the identified device to perform the operation of the request within bounds of a policy; and
prioritize communication of a result of the operation to a remote storage location, communication prioritization determined based on a demand level and an operation restriction of a compute resource as defined by the policy.

15. The non-transitory machine-readable medium of claim 14, wherein the policy is a time-based policy or a utilization-based policy associated with the type of compute resource associated with the request.

16. The non-transitory machine-readable medium of claim 14, wherein the set of instructions are executable by the processor to further:
provide a number of devices permission to a local compute resource, the number of devices each being from a class of devices associated with the request.

17. The non-transitory machine-readable medium of claim 14, wherein the set of instructions are executable by the processor to further:
provide a number of devices access to a local compute resource based on a type of analysis associated with the request.

18. The non-transitory machine-readable medium of claim 14, wherein the set of instructions are executable by the processor to further:
determine that the request includes generation of a group event;
generate a number of clusters for the request, the clusters associated with the type of compute resource; and
send a portion of the request to each cluster to perform the portion with a compute resource of the type of compute resource associated with the request.

19. The non-transitory machine-readable medium of claim 14, wherein the set of instructions are executable by the processor to further:
send a first routine of the request to a number of devices based on a match between a class of devices of the number of devices and a class of devices corresponding to the type of compute resource associated with the first routine.

20. The non-transitory machine-readable medium of claim 14, wherein the set of instructions are executable by the processor to further:
in response to determining that local compute resources are sufficient for the request:
identify a local compute resource within a local environment with a data property associated with a first routine of the request; and
perform the first routine using the local compute resource in response to determining that a destination that is to receive a result of the first routine is within the local environment;
in response to a determination that a local compute resource is insufficient for the request:
send the first routine to a number of devices having the type of compute resource associated with the first routine based on a data property associated with the request;
prioritize a performance of the first routine via the number of devices based on a demand level identified by monitored requests; and
cause allocation of network time for the number of devices to send data to a cloud service based on the type of data of the request, the policy being a time-based policy associated with a network resource and the cloud service being the remote storage location.

* * * * *